US010798629B2

(12) United States Patent
Zhou et al.

(10) Patent No.: US 10,798,629 B2
(45) Date of Patent: Oct. 6, 2020

(54) VOWIFI CALL PROCESSING METHOD OF MOBILE TERMINAL, SYSTEM, AND MOBILE TERMINAL

(71) Applicant: TCL Communications (Ningbo) Co., Ltd., Ningbo (CN)

(72) Inventors: Xiaolu Zhou, Ningbo (CN); Caijin Zhong, Ningbo (CN); Maowu Zhu, Ningbo (CN)

(73) Assignee: TCL Communications (Ningbo) Co., Ltd., Ningbo (CN)

( * ) Notice: Subject to any disclaimer, the term of this patent is extended or adjusted under 35 U.S.C. 154(b) by 0 days.

(21) Appl. No.: 16/487,111

(22) PCT Filed: Feb. 9, 2018

(86) PCT No.: PCT/CN2018/076037
§ 371 (c)(1),
(2) Date: Aug. 20, 2019

(87) PCT Pub. No.: WO2018/149368
PCT Pub. Date: Aug. 23, 2018

(65) Prior Publication Data
US 2020/0059839 A1 Feb. 20, 2020

(30) Foreign Application Priority Data
Feb. 20, 2017 (CN) .......................... 2017 1 0090378

(51) Int. Cl.
*H04W 36/08* (2009.01)
*H04W 36/00* (2009.01)
(Continued)

(52) U.S. Cl.
CPC .......... *H04W 36/08* (2013.01); *H04M 7/006* (2013.01); *H04W 8/18* (2013.01);
(Continued)

(58) Field of Classification Search
CPC ..... H04W 36/08; H04W 36/305; H04W 8/18; H04W 36/0022; H04W 36/14; H04M 7/006
See application file for complete search history.

(56) References Cited

U.S. PATENT DOCUMENTS 9,338,588 B1    5/2016  Patel et al.
9,723,154 B2 *  8/2017  Damstra ............... H04M 15/43
(Continued)

FOREIGN PATENT DOCUMENTS

CN    1798427      7/2006
CN    101427599    5/2009
(Continued)

OTHER PUBLICATIONS

International Search Report and the Written Opinion dated Apr. 27, 2018 From the International Searching Authority Re. Application No. PCT/CN2018/076037. (8 pages).

*Primary Examiner* — Jinsong Hu
*Assistant Examiner* — Farideh Madani (57) ABSTRACT

A method, system, and mobile terminal for processing Voice over WiFi (VoWiFi) calls for a mobile terminal is proposed. The method includes pre-performing VoWiFi registration and controlling switches between WiFi access points (APs) during a communication state and an idle state under a VoWiFi network; forbidding the mobile terminal to initiate switches between the WiFi APs in the communication state under the VoWiFi network, and switching to a cellular network to implement voice communication when the mobile terminal is unable to connect to a WiFi network; and initiating AP switches and checking a network connection state for an AP in the idle state under the VoWiFi network. The method ensures that quality of voice communication of (Continued)

the mobile terminal under a VoWiFi network will not affected by frequent switches between multiple WiFi APs.

15 Claims, 1 Drawing Sheet

(51) Int. Cl.
| | | |
|---|---|---|
| *H04M 7/00* | (2006.01) | |
| *H04W 76/18* | (2018.01) | |
| *H04W 36/30* | (2009.01) | |
| *H04W 8/18* | (2009.01) | |
| *H04W 36/14* | (2009.01) | |
| *H04W 48/02* | (2009.01) | |
| *H04W 12/08* | (2009.01) | |
| *H04W 84/12* | (2009.01) | |

(52) U.S. Cl.
CPC ....... *H04W 36/0022* (2013.01); *H04W 36/14* (2013.01); *H04W 36/305* (2018.08); *H04W 48/02* (2013.01); *H04W 76/18* (2018.02); *H04W 12/0804* (2019.01); *H04W 12/0808* (2019.01); *H04W 84/12* (2013.01)

(56) References Cited

U.S. PATENT DOCUMENTS

| | | |
|---|---|---|
| 10,057,829 B2 | 8/2018 | Zhang et al. |
| 10,070,358 B2* | 9/2018 | Lim ................. H04W 36/22 |
| 10,368,281 B2 | 7/2019 | Ganesan |
| 2004/0233840 A1 | 11/2004 | Bye |
| 2014/0171084 A1 | 6/2014 | Chandler et al. |
| 2014/0376511 A1 | 12/2014 | Kalapatapu et al. |
| 2016/0219609 A1* | 7/2016 | Patel ................... H04M 1/7253 |
| 2016/0374104 A1* | 12/2016 | Watfa ................... H04W 72/10 |
| 2017/0070919 A1* | 3/2017 | Verger ................. H04L 65/1083 |

FOREIGN PATENT DOCUMENTS

| | | |
|---|---|---|
| CN | 105657788 | 6/2016 |
| CN | 106900021 | 6/2017 |
| WO | WO 2016/101179 | 6/2016 |
| WO | WO 2018/149368 | 8/2018 |

* cited by examiner

VOWIFI CALL PROCESSING METHOD OF MOBILE TERMINAL, SYSTEM, AND MOBILE TERMINAL

RELATED APPLICATIONS

This application is a National Phase of PCT Patent Application No. PCT/CN2018/076037 having International filing date of Feb. 9, 2018, which claims the benefit of priority of Chinese Patent Application No. 201710090378.9 filed on Feb. 20, 2017. The contents of the above applications are all incorporated by reference as if fully set forth herein in their entirety.

FIELD AND BACKGROUND OF THE INVENTION

The present invention relates to intelligent terminal technologies, and more particularly to a method, system, and mobile terminal for processing VoWiFi calls for a mobile terminal.

With development of IP multimedia subsystems (IMS), a brand new form of multimedia services which can satisfy the demand of more innovative and more diversified multimedia services for end customers, voice over WiFi (VoWiFi) technologies will soon enter into our lives although currently domestic operators have not put VoWiFi technologies into commercial use yet. The coming of VoWiFi will be a revolutionary reform. The operators can use it to solve the problem of mobile signals in indoor coverage and remote mountains. Voice communication and short message texting can be conducted, just like cellular networks, as long as there are WiFi signals.

When end users use WiFi, operators' core networks can be accessed through evolved packet data gateway (ePDG) and trusted WiFi access gateway (TWAG). Based on IMS, VoLTE and VoWiFi can be switched therebetween without affecting user experience.

Currently, VoWiFi generally adopted by every large operators in the world depends on interfaces of untrustable WiFi networks and core networks using GPRS tunneling protocol (GTP)/proxy mobile IP (PMIP) protocol. Fixed networks access to packet data network gateway ((PDN GW) by ePDG. Communication between untrusted fixed networks and evolved packet core (EPC) is achieved by enhancing ePDG. S2b interface requires internet protocol security (IPsec) to be established between a terminal and ePDG.

WiFi is widespread in our lives. Access pints (APs) to WiFi networks have a small coverage range and mobile users need to frequently switch between the APs. The AP is a wireless access point. The AP is a HUB in a traditional wired network. It is a commonly used device in establishing a small wireless local area network. The AP is equivalent to a bridge for connecting a wired network and a wireless network. The main function of the AP is to connect every client using the wireless network and then allow the wireless network to access to the Ethernet. WiFi switching may seriously affect VoWiFi, resulting in poor voice communication quality and call drop, or even unable to register to VoWiFi. During a VoWiFi call conducted by a terminal, if switches between multiple WiFi APs take place, it is very possible to encounter an uncertain AP to cause call drop or lowering the voice communication quality.

SUMMARY OF THE INVENTION

The present invention provides a method, system, and mobile terminal for processing VoWiFi calls for a mobile terminal, for implementing different strategies to manage multiple WiFi APs in a communication state and an idle state, thereby ensuring that quality of voice communication of the mobile terminal under a VoWiFi network will not affected by frequent switches between multiple WiFi APs. The quality of voice communication under the VoWiFi network is improved.

To solve the technical problems, technical schemes provided by the present invention are described below.

A method for processing Voice over WiFi (VoWiFi) calls for a mobile terminal, including:

pre-performing VoWiFi registration using the mobile terminal, and controlling and managing switches between a plurality of WiFi access points (APs) during a communication state and an idle state under a VoWiFi network;

forbidding the mobile terminal to initiate switches between the WiFi APs when the mobile terminal is detected to be in the communication state under the VoWiFi network, and controlling the mobile terminal to switch to a cellular network to implement voice communication when the mobile terminal is unable to connect to a WiFi network; and controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to a network, returning to an original AP and continuing to search when the AP is unable to establish a connection to the network.

In the method for processing VoWiFi calls for the mobile terminal, the AP in the case that the mobile terminal is in the communication state under the VoWiFi network includes a public WiFi access point using media access control (MAC) address filtering or static address binding to restrict access to the Internet, a public WiFi access point using two-step verification to restrict access to the Internet, and a private WiFi access point with password protection unable to access to the Internet.

In the method for processing VoWiFi calls for the mobile terminal, the AP in the case that the mobile terminal is in the idle state under the VoWiFi network includes a public WiFi access point using two-step verification to get access to the Internet, a private WiFi access point with password protection unable to access to the Internet, and a private WiFi access point with password protection available to access to the Internet.

In the method for processing VoWiFi calls for the mobile terminal, the step of forbidding the mobile terminal to initiate switches between the WiFi APs when the mobile terminal is detected to be in the communication state under the VoWiFi network, and controlling the mobile terminal to switch to the cellular network to implement communication when the mobile terminal is unable to connect to the WiFi network includes:

detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network;

detecting whether the mobile terminal is during a phone call by using +CLCC statement if the mobile terminal is registered to the VoWiFi network, forbidding the switches between the WiFi APs if the mobile terminal is during an active call, and turning to switches between the APs defined in the idle state if the mobile terminal is not during the active call;

controlling the mobile terminal to switch to the cellular network to implement the voice communication using voice over LTE (VoLTE), the second generation (2G), or the third generation (3G) communication technologies if the mobile terminal is unable to connect to WiFi; and after the mobile terminal switches to the cellular network for the voice communication, switching to a matched AP and reperforming the VoWiFi registration using the mobile terminal when the matched AP is obtained by WiFi searching by the mobile terminal.

In the method for processing VoWiFi calls for the mobile terminal, the step of controlling the mobile terminal to initiate AP switches and checking the network connection state for the AP when the mobile terminal is detected to be in the idle state under the VoWiFi network and thus the mobile terminal is in standby mode, staying at the AP when the AP is able to establish a normal connection to a network, returning to the original AP and continuing to search when the AP is unable to establish a connection to the network includes:

detecting whether the mobile terminal is during a phone call by using +CLCC statement if the mobile terminal is registered to the VoWiFi network;

initiating the switches between the WiFi APs by the mobile terminal when the mobile terminal is detected to be in the idle state under the VoWiFi network;

forbidding the mobile terminal to automatically switch to a WiFi AP that is detected to be the public WiFi access point requiring the two-step verification; and controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the network, returning to the original AP and continuing to search when the AP is unable to establish the connection to the network.

A system for processing Voice over WiFi (VoWiFi) calls for a mobile terminal, including:

one or more processors;

a memory; and one or more application programs, stored in the memory and configured to be executed by the processor, the one or more application programs including:

a registering and managing module, configured for pre-performing VoWiFi registration using the mobile terminal, and controlling and managing switches between a plurality of WiFi access points (APs) during a communication state and an idle state under a VoWiFi network;

a voice communication processing module, configured for forbidding the mobile terminal to initiate switches between the WiFi APs when the mobile terminal is detected to be in the communication state under the VoWiFi network, and controlling the mobile terminal to switch to a cellular network to implement voice communication when the mobile terminal is unable to connect to a WiFi network; and an idle processing module, configured for controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to a network, returning to an original AP and continuing to search when the AP is unable to establish a connection to the network.

In the system for processing VoWiFi calls for the mobile terminal, the AP in the case that the mobile terminal is in the communication state under the VoWiFi network includes a public WiFi access point using media access control (MAC) address filtering or static address binding to restrict access to the Internet, a public WiFi access point using two-step verification to restrict access to the Internet, and a private WiFi access point with password protection unable to access to the Internet.

In the system for processing VoWiFi calls for the mobile terminal, the AP in the case that the mobile terminal is in the idle state under the VoWiFi network includes a public WiFi access point using two-step verification to get access to the Internet, a private WiFi access point with password protection unable to access to the Internet, and a private WiFi access point with password protection available to access to the Internet.

In the system for processing VoWiFi calls for the mobile terminal, the voice communication processing module includes:

a registration detecting unit, configured for detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network;

a first voice communication detecting unit, configured for detecting whether the mobile terminal is during a phone call by using +CLCC statement if the mobile terminal is registered to the VoWiFi network, forbidding the switches between the WiFi APs if the mobile terminal is during an active call, and turning to switches between the APs defined in the idle state if the mobile terminal is not during the active call;

a first switch processing unit, configured for controlling the mobile terminal to switch to the cellular network to implement the voice communication using voice over LTE (VoLTE), the second generation (2G), or the third generation (3G) communication technologies if the mobile terminal is unable to connect to WiFi; and a re-registering unit, configured for switching, after the mobile terminal switches to the cellular network for the voice communication, to a matched AP and reperforming the VoWiFi registration using the mobile terminal when the matched AP is obtained by WiFi searching by the mobile terminal.

In the system for processing VoWiFi calls for the mobile terminal, the idle processing module includes:

a second voice communication detecting unit, configured for detecting whether the mobile terminal is during a phone call by using +CLCC statement if the mobile terminal is registered to the VoWiFi network;

a switch initiating unit, configured for initiating the switches between the WiFi APs by the mobile terminal when the mobile terminal is detected to be in the idle state under the VoWiFi network;

a switch forbidding unit, configured for forbidding the mobile terminal to automatically switch to a WiFi AP that is detected to be the public WiFi access point requiring the two-step verification; and a second switch processing unit, configured for controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the network, returning to the original AP and continuing to search when the AP is unable to establish the connection to the network.

The present invention further provides a mobile terminal, which includes a processor and a memory, the memory configured to store instructions and data, the processor configured to execute the steps of:

pre-performing VoWiFi registration using the mobile terminal, and controlling and managing switches between a plurality of WiFi access points (APs) during a communication state and an idle state under a VoWiFi network, an indoor coverage of the WiFi APs ranged from 30 m to 100 m;

forbidding the mobile terminal to initiate switches between the WiFi APs when the mobile terminal is detected to be in the communication state under the VoWiFi network, and controlling the mobile terminal to switch to a cellular network to implement voice communication when the mobile terminal is unable to connect to a WiFi network; and controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to a network, returning to an original AP and continuing to search when the AP is unable to establish a connection to the network.

In the mobile terminal, the AP in the case that the mobile terminal is in the communication state under the VoWiFi network includes a public WiFi access point using media access control (MAC) address filtering or static address binding to restrict access to the Internet, a public WiFi access point using two-step verification to restrict access to the Internet, and a private WiFi access point with password protection unable to access to the Internet.

In the mobile terminal, the AP in the case that the mobile terminal is in the idle state under the VoWiFi network includes a public WiFi access point using two-step verification to get access to the Internet, a private WiFi access point with password protection unable to access to the Internet, and a private WiFi access point with password protection available to access to the Internet.

In the mobile terminal, the step of forbidding the mobile terminal to initiate switches between the WiFi APs when the mobile terminal is detected to be in the communication state under the VoWiFi network, and controlling the mobile terminal to switch to the cellular network to implement communication when the mobile terminal is unable to connect to the WiFi network includes:

detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network;

detecting whether the mobile terminal is during a phone call by using +CLCC statement if the mobile terminal is registered to the VoWiFi network, forbidding the switches between the WiFi APs if the mobile terminal is during an active call, and turning to switches between the APs defined in the idle state if the mobile terminal is not during the active call;

controlling the mobile terminal to switch to the cellular network to implement the voice communication using voice over LTE (VoLTE), the second generation (2G), or the third generation (3G) communication technologies if the mobile terminal is unable to connect to WiFi; and after the mobile terminal switches to the cellular network for the voice communication, switching to a matched AP and reperforming the VoWiFi registration using the mobile terminal when the matched AP is obtained by WiFi searching by the mobile terminal.

In the mobile terminal, the step of controlling the mobile terminal to initiate AP switches and checking the network connection state for the AP when the mobile terminal is detected to be in the idle state under the VoWiFi network and thus the mobile terminal is in standby mode, staying at the AP when the AP is able to establish a normal connection to a network, returning to the original AP and continuing to search when the AP is unable to establish a connection to the network includes:

detecting whether the mobile terminal is during a phone call by using +CLCC statement if the mobile terminal is registered to the VoWiFi network;

initiating the switches between the WiFi APs by the mobile terminal when the mobile terminal is detected to be in the idle state under the VoWiFi network;

forbidding the mobile terminal to automatically switch to a WiFi AP that is detected to be the public WiFi access point requiring the two-step verification; and controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the network, returning to the original AP and continuing to search when the AP is unable to establish the connection to the network.

The present invention discloses a method, system, and mobile terminal for processing VoWiFi calls for a mobile terminal. The method includes pre-performing, using a mobile terminal, an VoWiFi registration, controlling and managing, in a VoWiFi call state and idle state, switches among a plurality of WiFi APs; when the mobile terminal is in the call state in a VoWiFi network, forbidding the mobile terminal to initiate an inter-WiFi AP switch, and when the mobile terminal is unable to connect to the WiFi network, controlling the mobile terminal to switch to a cellular network to call; and when the mobile terminal is in the idle state in the VoWiFi network, controlling the mobile terminal to initiate an AP switch and checking an AP connection state, when an AP can establish a normal connection to a network, staying at the AP, and when the AP cannot establish a connection to the network, returning to an original AP and continuing to search.

The present invention implements different strategies to manage multiple WiFi APs in a communication state and an idle state, thereby ensuring that quality of voice communication of the mobile terminal under a VoWiFi network will not affected by frequent switches between multiple WiFi APs. The quality of voice communication under the VoWiFi network is improved.

DESCRIPTION OF SPECIFIC EMBODIMENTS OF THE INVENTION

To make the objectives, technical schemes, and advantages of the present invention more clear and specific, the present invention is described in further detail below with reference to the embodiments in accompanying with the appending drawings. It should be understood that the specific embodiments described herein are merely for explaining the present invention and the present invention is not limited thereto.

Figure 1:
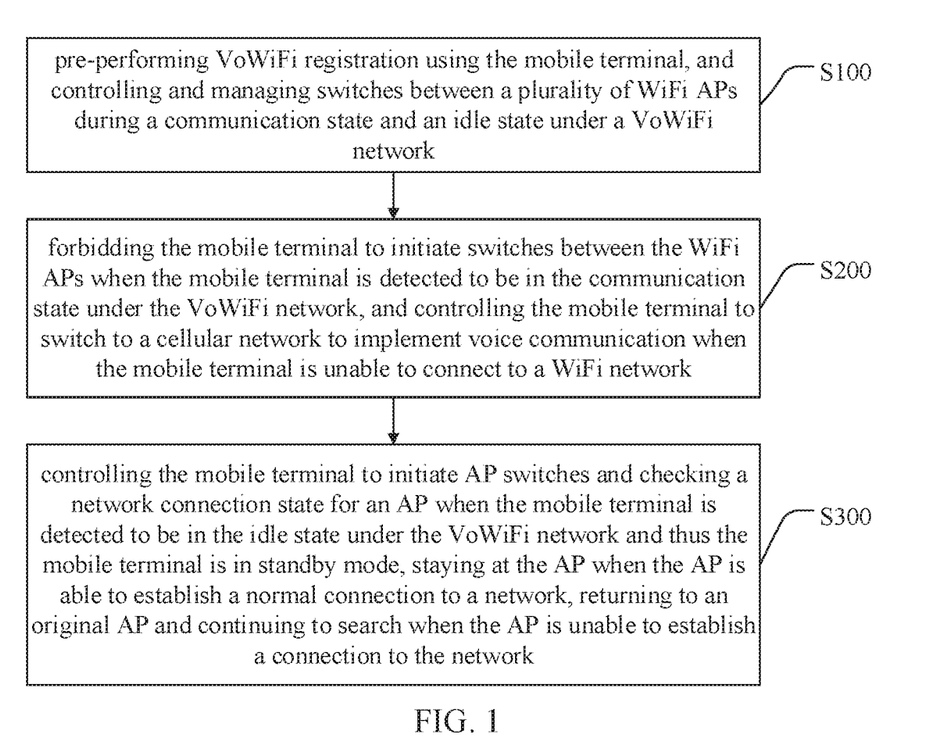
FIG. 1 is a flowchart of a method for processing VoWiFi calls for a mobile terminal according to a preferred embodiment of the present invention.

FIG. 1 is a flowchart of a method for processing Voice over WiFi (VoWiFi) calls for a mobile terminal according to a preferred embodiment of the present invention.

As shown in FIG. 1, the method of the embodiment of the present invention includes the following steps.

Step S100—pre-performing VoWiFi registration using the mobile terminal, and controlling and managing switches between a plurality of WiFi access points (APs) during a communication state and an idle state under a VoWiFi network.

In the present invention, the AP in the case that the mobile terminal is in the communication state under the VoWiFi network includes a public WiFi access point using media access control (MAC) address filtering or static address binding to restrict access to the Internet (that is, any device can access to without setting a password), a public WiFi access point with pre-stored MAC address filtering schemes and static addresses using two-step verification to restrict access to the Internet (that is, any device can access to without setting a password), and a private WiFi access point with password protection unable to access to the Internet (that is, a password is set but the mobile terminal has already preserved the password).

In addition, the AP in the case that the mobile terminal is in the idle state under the VoWiFi network includes a public WiFi access point using two-step verification to get access to the Internet, a private WiFi access point with password protection unable to access to the Internet (that is, a password is set but the mobile terminal has already preserved the password), and a private WiFi access point with password protection available to access to the Internet.

After the mobile terminal is registered to the VoWiFi network, the present invention manages strategies for the switches between the WiFi APs during the communication state and the idle state. In the switches between the WiFi APs, the reason why a large delay is caused in the WiFi switching is very simple. That is, 802.11 protocol (pertaining to a standard made by Institute of Electrical and Electronics Engineers (IEEE) for local area networks) does not do a fair amount of preparation for possible switches. Specifically, in a WiFi network, a mobile terminal basically keeps connected with an AP. Only when quality of this connection becomes unacceptable, a mobile system (MS) turns to try to connect with other APs. Since a mobile terminal will not prepare for any possible switch during normal communication, it knows nothing about AP resources around. This may lead to switch from an AP able to connect to a network normally to an AP having a strong signal but poor in network quality or even unable to connect to a network.

Most of wireless APs support multi-user access, data encryption, transmission with variable speeds, and etc. Some products also provide a complete management function for wireless networks. As to wireless local area networks for small coverage application scenarios such as family and office, it generally needs only one wireless AP to achieve wireless access from all computing devices.

Indoor coverage for an AP is generally ranged from 30 to 100 meters. AP products from many manufactures can be connected to each other for increasing wireless local area network (WLAN) coverage area. The coverage range for each AP has some limits. Just as cellphones can roam between base stations, clients in the WLAN can roam between APs.

Accordingly, when the mobile terminal conducts voice communication over VoWiFi, it is very possible to encounter uncertain APs to cause call drop or poor voice communication quality.

Step S200—forbidding the mobile terminal to initiate switches between the WiFi APs when the mobile terminal is detected to be in the communication state under the VoWiFi network, and controlling the mobile terminal to switch to a cellular network to implement voice communication when the mobile terminal is unable to connect to a WiFi network.

When the mobile terminal is detected to be in the communication state under the VoWiFi network, the mobile terminal is forbidden to initiate switches between the WiFi APs so as to prevent uncertain APs, brought from the switches between the WiFi APs, from causing poor voice communication quality or call drop.

Step S200 further includes the followings.

Step S210—detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network;

Step S220—detecting whether the mobile terminal is during a phone call by using +CLCC statement if the mobile terminal is registered to the VoWiFi network, forbidding the switches between the WiFi APs if the mobile terminal is during an active call, and turning to switches between the APs defined in the idle state if the mobile terminal is not during the active call;

Step S230—controlling the mobile terminal to switch to the cellular network to implement the voice communication using voice over LTE (VoLTE), the second generation (2G), or the third generation (3G) communication technologies if the mobile terminal is unable to connect to WiFi (the mobile terminal is distanced away from the WiFi, resulting in signal worsening); and Step S240—after the mobile terminal switches to the cellular network for the voice communication, switching to a matched AP and reperforming the VoWiFi registration using the mobile terminal when the matched AP is obtained by WiFi searching by the mobile terminal.

In the present invention, AP switch control is mainly achieved when the mobile terminal is detected to be in the communication state under the VoWiFi network. After the mobile terminal is registered to the VoWiFi network and conducts voice communication over VoWiFi, the mobile terminal is forbidden to initiate switches between the WiFi APs so as to prevent uncertain APs, brought from the switches between the WiFi APs, from causing poor voice communication quality or call drop.

Step S300—controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to a network, returning to an original AP and continuing to search when the AP is unable to establish a connection to the network.

That is, when the mobile terminal is detected to be in the idle state under the VoWiFi network and thus the mobile terminal is in standby mode, switching between uncertain APs and staying at the AP unable to establish a connection to the network is forbidden for the mobile terminal in the idle state under the VoWiFi network.

Step S300 further includes the followings.

Step S310—detecting whether the mobile terminal is during a phone call by using +CLCC statement if the mobile terminal is registered to the VoWiFi network;

Step S320—initiating the switches between the WiFi APs by the mobile terminal when the mobile terminal is detected to be in the idle state under the VoWiFi network;

Step S330—forbidding the mobile terminal to automatically switch to a WiFi AP that is detected to be the public WiFi access point requiring the two-step verification; and Step S340—controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the network, returning to the original AP and continuing to search when the AP is unable to establish the connection to the network.

In the present invention, AP switch control is conducted when the mobile terminal is detected to be in the idle state (i.e., not during a call) under the VoWiFi network. After the mobile terminal is registered to the VoWiFi network and VoWiFi is kept under an idle model, the mobile terminal is in standby mode. In this mode, the mobile terminal can be an active side initiating a voice call/a short message/a multimedia message and a passive side receiving a voice call/a short message/a multimedia message. The management on multiple WiFi APs in this mode mainly avoids switching to uncertain APs, causing the VoWiFi to be unusable.

Figure 2:
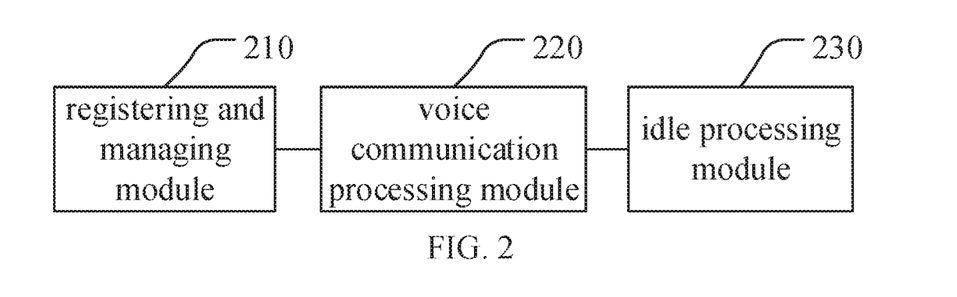
FIG. 2 is a diagram illustrating functions and principles of a system for processing VoWiFi calls for a mobile terminal according to a preferred embodiment of the present invention.

Based on above method embodiments, the present invention further provides system for processing Voice over WiFi (VoWiFi) calls for a mobile terminal. As shown in FIG. 2, the system includes the followings.

A registering and managing module 210 is configured for pre-performing VoWiFi registration using the mobile terminal, and controlling and managing switches between a plurality of WiFi access points (APs) during a communication state and an idle state under a VoWiFi network. Please refer to above context for details.

A voice communication processing module 220 is configured for forbidding the mobile terminal to initiate switches between the WiFi APs when the mobile terminal is detected to be in the communication state under the VoWiFi network, and controlling the mobile terminal to switch to a cellular network to implement voice communication when the mobile terminal is unable to connect to a WiFi network. Please refer to above context for details.

An idle processing module 230 is configured for controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to a network, returning to an original AP and continuing to search when the AP is unable to establish a connection to the network. Please refer to above context for details.

Further, in the system for processing VoWiFi calls for the mobile terminal, the AP in the case that the mobile terminal is in the communication state under the VoWiFi network includes a public WiFi access point using media access control (MAC) address filtering or static address binding to restrict access to the Internet, a public WiFi access point using two-step verification to restrict access to the Internet, and a private WiFi access point with password protection unable to access to the Internet. Please refer to above context for details.

Further, in the system for processing VoWiFi calls for the mobile terminal, the AP in the case that the mobile terminal is in the idle state under the VoWiFi network includes a public WiFi access point using two-step verification to get access to the Internet, a private WiFi access point with password protection unable to access to the Internet, and a private WiFi access point with password protection available to access to the Internet. Please refer to above context for details.

Further, in the system for processing VoWiFi calls for the mobile terminal, the voice communication processing module includes:

A registration detecting unit is configured for detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network. Please refer to above context for details.

A first voice communication detecting unit is configured for detecting whether the mobile terminal is during a phone call by using +CLCC statement if the mobile terminal is registered to the VoWiFi network, forbidding the switches between the WiFi APs if the mobile terminal is during an active call, and turning to switches between the APs defined in the idle state if the mobile terminal is not during the active call. Please refer to above context for details.

A first switch processing unit is configured for controlling the mobile terminal to switch to the cellular network to implement the voice communication using voice over LTE (VoLTE), the second generation (2G), or the third generation (3G) communication technologies if the mobile terminal is unable to connect to WiFi. Please refer to above context for details.

A re-registering unit is configured for switching, after the mobile terminal switches to the cellular network for the voice communication, to a matched AP and reperforming the VoWiFi registration using the mobile terminal when the matched AP is obtained by WiFi searching by the mobile terminal. Please refer to above context for details.

Further, in the system for processing VoWiFi calls for the mobile terminal, the idle processing module includes:

A second voice communication detecting unit is configured for detecting whether the mobile terminal is during a phone call by using +CLCC statement if the mobile terminal is registered to the VoWiFi network. Please refer to above context for details.

A switch initiating unit is configured for initiating the switches between the WiFi APs by the mobile terminal when the mobile terminal is detected to be in the idle state under the VoWiFi network. Please refer to above context for details.

A switch forbidding unit is configured for forbidding the mobile terminal to automatically switch to a WiFi AP that is detected to be the public WiFi access point requiring the two-step verification. Please refer to above context for details.

A second switch processing unit is configured for controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the network, returning to the original AP and continuing to search when the AP is unable to establish the connection to the network. Please refer to above context for details.

The present invention further provides a mobile terminal, which includes a processor and a memory, the memory configured to store instructions and data, the processor configured to execute the steps of:

pre-performing VoWiFi registration using the mobile terminal, and controlling and managing switches between a plurality of WiFi access points (APs) during a communication state and an idle state under a VoWiFi network;

forbidding the mobile terminal to initiate switches between the WiFi APs when the mobile terminal is detected to be in the communication state under the VoWiFi network, and controlling the mobile terminal to switch to a cellular network to implement voice communication when the mobile terminal is unable to connect to a WiFi network; and controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to a network, returning to an original AP and continuing to search when the AP is unable to establish a connection to the network.

Above all, the present invention discloses a method, system, and mobile terminal for processing VoWiFi calls for a mobile terminal. The method includes pre-performing, using a mobile terminal, an VoWiFi registration, controlling and managing, in a VoWiFi call state and idle state, switches among a plurality of WiFi APs; when the mobile terminal is in the call state in a VoWiFi network, forbidding the mobile terminal to initiate an inter-WiFi AP switch, and when the mobile terminal is unable to connect to the WiFi network, controlling the mobile terminal to switch to a cellular network to call; and when the mobile terminal is in the idle state in the VoWiFi network, controlling the mobile terminal to initiate an AP switch and checking an AP connection state, when an AP can establish a normal connection to a network, staying at the AP, and when the AP cannot establish a connection to the network, returning to an original AP and continuing to search.

Of course, those skilled in the art shall understand that all or parts of the steps in the above method embodiments may be achieved by commanding the related hardware (e.g., processors and controllers) with programs. The programs may be stored in a computer readable storage medium, and the programs may include flows in each of above method embodiments when executed. The storage medium can be a memory, a magnetic disk, and an optical disc.

It should be understood that the application of the present invention is not limited to the above-described examples. Those of ordinary skill in the art may make modifications or variations according to the above descriptions, but all such modifications and variations should be within the appended claims.

What is claimed is:

1. A method for processing Voice over WiFi (VoWiFi) calls for a mobile terminal, comprising:
   pre-performing VoWiFi registration using the mobile terminal, and controlling and managing switches between a plurality of WiFi access points (APs) during a communication state and an idle state under a VoWiFi network, wherein the pre-performing the VoWiFi registration is done by registering the mobile terminal to the VoWiFi network;
   forbidding the mobile terminal to initiate switches between the WiFi APs when the mobile terminal is detected to be in the communication state under the VoWiFi network, forbidding the switches between the WiFi APs when the mobile terminal is registered to the VoWiFi network and is during an active call, and controlling the mobile terminal to switch to a cellular network to implement voice communication when the mobile terminal is unable to connect to a WiFi network; and
   controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to the VoWiFi network, returning to an original AP and continuing to search when the AP is unable to establish a connection to the VoWiFi network.

2. The method according to claim 1, wherein the AP in the case that the mobile terminal is in the communication state under the VoWiFi network comprises a public WiFi access point using media access control (MAC) address filtering or static address binding to restrict access to an Internet, a public WiFi access point using two-step verification to restrict access to the Internet, and a private WiFi access point with password protection unable to access to the Internet.

3. The method according to claim 1, wherein the AP in the case that the mobile terminal is in the idle state under the VoWiFi network comprises a public WiFi access point using two-step verification to get access to an Internet, a private WiFi access point with password protection unable to access to the Internet, and a private WiFi access point with password protection available to access to the Internet.

4. The method according to claim 2, wherein the step of forbidding the mobile terminal to initiate switches between the WiFi APs when the mobile terminal is detected to be in the communication state under the VoWiFi network, and controlling the mobile terminal to switch to the cellular network to implement communication when the mobile terminal is unable to connect to the WiFi network comprises:
   detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network;
   detecting whether the mobile terminal is during a phone call by using List Current Calls (+CLCC) statement if the mobile terminal is registered to the VoWiFi network, forbidding the switches between the WiFi APs if the mobile terminal is during an active call, and turning to switches between the APs defined in the idle state if the mobile terminal is not during the active call;
   controlling the mobile terminal to switch to the cellular network to implement the voice communication using voice over Long-Term Evolution (VoLTE), the second generation (2G), or the third generation (3G) communication technologies if the mobile terminal is unable to connect to WiFi; and after the mobile terminal switches to the cellular network for the voice communication, switching to a matched AP and reperforming the VoWiFi registration using the mobile terminal when the matched AP is obtained by WiFi searching by the mobile terminal.

5. The method according to claim 3, wherein the step of controlling the mobile terminal to initiate AP switches and checking the network connection state for the AP when the mobile terminal is detected to be in the idle state under the VoWiFi network and thus the mobile terminal is in standby mode, staying at the AP when the AP is able to establish a normal connection to the VoWiFi network, returning to the original AP and continuing to search when the AP is unable to establish a connection to the VoWiFi network comprises:

detecting whether the mobile terminal is during a phone call by using +CLCC statement if the mobile terminal is registered to the VoWiFi network;

initiating the switches between the WiFi APs by the mobile terminal when the mobile terminal is detected to be in the idle state under the VoWiFi network;

forbidding the mobile terminal to automatically switch to a WiFi AP that is detected to be the public WiFi access point requiring the two-step verification; and controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the VoWiFi network, returning to the original AP and continuing to search when the AP is unable to establish the connection to the VoWiFi network.

6. A system for processing Voice over WiFi (VoWiFi) calls for a mobile terminal, comprising:

one or more processors;

a memory; and one or more application programs, stored in the memory and configured to be executed by the processor, the one or more application programs comprising:

a registering and managing module, configured for pre-performing VoWiFi registration using the mobile terminal, and controlling and managing switches between a plurality of WiFi access points (APs) during a communication state and an idle state under a VoWiFi network, wherein the pre-performing the VoWiFi registration is done by registering the mobile terminal to the VoWiFi network;

a voice communication processing module, configured for forbidding the mobile terminal to initiate switches between the WiFi APs when the mobile terminal is detected to be in the communication state under the VoWiFi network, forbidding the switches between the WiFi APs when the mobile terminal is registered to the VoWiFi network and is during an active call, and controlling the mobile terminal to switch to a cellular network to implement voice communication when the mobile terminal is unable to connect to a WiFi network; and an idle processing module, configured for controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to the VoWiFi network, returning to an original AP and continuing to search when the AP is unable to establish a connection to the VoWiFi network.

7. The system according to claim 6, wherein the AP in the case that the mobile terminal is in the communication state under the VoWiFi network comprises a public WiFi access point using media access control (MAC) address filtering or static address binding to restrict access to an Internet, a public WiFi access point using two-step verification to restrict access to the Internet, and a private WiFi access point with password protection unable to access to the Internet.

8. The system according to claim 6, wherein the AP in the case that the mobile terminal is in the idle state under the VoWiFi network comprises a public WiFi access point using two-step verification to get access to an Internet, a private WiFi access point with password protection unable to access to the Internet, and a private WiFi access point with password protection available to access to the Internet.

9. The system according to claim 7, wherein the voice communication processing module comprises:

a registration detecting unit, configured for detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network;

a first voice communication detecting unit, configured for detecting whether the mobile terminal is during a phone call by using List Current Calls (+CLCC) statement if the mobile terminal is registered to the VoWiFi network, forbidding the switches between the WiFi APs if the mobile terminal is during an active call, and turning to switches between the APs defined in the idle state if the mobile terminal is not during the active call;

a first switch processing unit, configured for controlling the mobile terminal to switch to the cellular network to implement the voice communication using voice over Long-Term Evolution (VoLTE), the second generation (2G), or the third generation (3G) communication technologies if the mobile terminal is unable to connect to WiFi; and a re-registering unit, configured for switching, after the mobile terminal switches to the cellular network for the voice communication, to a matched AP and reperforming the VoWiFi registration using the mobile terminal when the matched AP is obtained by WiFi searching by the mobile terminal.

10. The system according to claim 8, wherein the idle processing module comprises:

a second voice communication detecting unit, configured for detecting whether the mobile terminal is during a phone call by using +CLCC statement if the mobile terminal is registered to the VoWiFi network;

a switch initiating unit, configured for initiating the switches between the WiFi APs by the mobile terminal when the mobile terminal is detected to be in the idle state under the VoWiFi network;

a switch forbidding unit, configured for forbidding the mobile terminal to automatically switch to a WiFi AP that is detected to be the public WiFi access point requiring the two-step verification; and a second switch processing unit, configured for controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the VoWiFi network, returning to the original AP and continuing to search when the AP is unable to establish the connection to the VoWiFi network.

11. A mobile terminal, comprising a processor and a memory, the memory configured to store instructions and data, the processor configured to execute the steps of:

pre-performing VoWiFi registration using the mobile terminal, and controlling and managing switches between a plurality of WiFi access points (APs) during a communication state and an idle state under a VoWiFi network, an indoor coverage of the WiFi APs ranged from 30 m to 100 m, wherein the pre-performing the VoWiFi registration is done by registering the mobile terminal to the VoWiFi network;

forbidding the mobile terminal to initiate switches between the WiFi APs when the mobile terminal is detected to be in the communication state under the VoWiFi network, forbidding the switches between the WiFi APs when the mobile terminal is registered to the VoWiFi network and is during an active call, and controlling the mobile terminal to switch to a cellular network to implement voice communication when the mobile terminal is unable to connect to a WiFi network; and controlling the mobile terminal to initiate AP switches and checking a network connection state for an AP when the mobile terminal is detected to be in the idle state under the VoWiFi network and thus the mobile terminal is in standby mode, staying at the AP when the AP is able to establish a normal connection to the VoWiFi network, returning to an original AP and continuing to search when the AP is unable to establish a connection to the VoWiFi network.

12. The mobile terminal according to claim 11, wherein the AP in the case that the mobile terminal is in the communication state under the VoWiFi network comprises a public WiFi access point using media access control (MAC) address filtering or static address binding to restrict access to an Internet, a public WiFi access point using two-step verification to restrict access to the Internet, and a private WiFi access point with password protection unable to access to the Internet.

13. The mobile terminal according to claim 11, wherein the AP in the case that the mobile terminal is in the idle state under the VoWiFi network comprises a public WiFi access point using two-step verification to get access to an Internet, a private WiFi access point with password protection unable to access to the Internet, and a private WiFi access point with password protection available to access to the Internet.

14. The mobile terminal according to claim 12, wherein the step of forbidding the mobile terminal to initiate switches between the WiFi APs when the mobile terminal is detected to be in the communication state under the VoWiFi network, and controlling the mobile terminal to switch to the cellular network to implement communication when the mobile terminal is unable to connect to the WiFi network comprises:

detecting on startup whether the mobile terminal has been registered to the VoWiFi network, and controlling the mobile terminal to trigger a WiFi switch in an ordinary way for subscriber identity module (SIM) cards not supporting VoWiFi or to search for appropriate networks if the mobile terminal is not registered to the VoWiFi network;

detecting whether the mobile terminal is during a phone call by using List Current Calls (+CLCC) statement if the mobile terminal is registered to the VoWiFi network, forbidding the switches between the WiFi APs if the mobile terminal is during an active call, and turning to switches between the APs defined in the idle state if the mobile terminal is not during the active call;

controlling the mobile terminal to switch to the cellular network to implement the voice communication using voice over Long-Term Evolution (VoLTE), the second generation (2G), or the third generation (3G) communication technologies if the mobile terminal is unable to connect to WiFi; and after the mobile terminal switches to the cellular network for the voice communication, switching to a matched AP and reperforming the VoWiFi registration using the mobile terminal when the matched AP is obtained by WiFi searching by the mobile terminal.

15. The mobile terminal according to claim 13, wherein the step of controlling the mobile terminal to initiate AP switches and checking the network connection state for the AP when the mobile terminal is detected to be in the idle state under the VoWiFi network and thus the mobile terminal is in standby mode, staying at the AP when the AP is able to establish a normal connection to the VoWiFi network, returning to the original AP and continuing to search when the AP is unable to establish a connection to the VoWiFi network comprises:

detecting whether the mobile terminal is during a phone call by using +CLCC statement if the mobile terminal is registered to the VoWiFi network;

initiating the switches between the WiFi APs by the mobile terminal when the mobile terminal is detected to be in the idle state under the VoWiFi network;

forbidding the mobile terminal to automatically switch to a WiFi AP that is detected to be the public WiFi access point requiring the two-step verification; and controlling the mobile terminal to initiate the AP switches and checking the network connection state for the WiFi APs that are detected to be the private WiFi access points or the available private WiFi access points that are not requiring the two-step verification, staying at the AP when the AP is able to establish the normal connection to the VoWiFi network, returning to the original AP and continuing to search when the AP is unable to establish the connection to the VoWiFi network.

* * * * *